US006676116B2

(12) United States Patent
Edberg et al.

(10) Patent No.: US 6,676,116 B2
(45) Date of Patent: Jan. 13, 2004

(54) ELASTOMERIC SUSPENSION AND MOUNTING SYSTEM

(75) Inventors: Donald L. Edberg, Irvine, CA (US); Adam C. Smith, Newport Beach, CA (US); Michael L. Hand, Huntington Beach, CA (US); Jonathan E. Bosley, Tucson, AZ (US)

(73) Assignee: The Boeing Company, Seattle, WA (US)

( * ) Notice: Subject to any disclaimer, the term of this patent is extended or adjusted under 35 U.S.C. 154(b) by 12 days.

(21) Appl. No.: 09/899,730

(22) Filed: Jul. 5, 2001

(65) Prior Publication Data

US 2003/0183995 A1 Oct. 2, 2003

(51) Int. Cl.[7] .................................................. F16F 3/08
(52) U.S. Cl. ........................................ 267/136; 267/153
(58) Field of Search ................................ 267/136, 140, 267/140.13, 292, 294, 153; 248/603, 613, 634, 636, 604

(56) References Cited

U.S. PATENT DOCUMENTS

| 1,586,531 | A | * | 6/1926 | Lipcot | 213/46 A |
|---|---|---|---|---|---|
| 1,930,310 | A | * | 10/1933 | Geyer | 248/635 |
| 2,241,026 | A | * | 5/1941 | Wylie | 267/141.5 |
| 2,241,409 | A | * | 5/1941 | Mason | 74/582 |
| 2,299,661 | A | * | 10/1942 | Symons | 209/415 |
| 3,167,294 | A | * | 1/1965 | Andrews et al. | 267/141.3 |
| 4,082,240 | A | | 4/1978 | Heathman et al. | |
| 4,509,781 | A | * | 4/1985 | Dick et al. | 293/104 |
| 4,784,378 | A | | 11/1988 | Ford | |
| 5,110,081 | A | | 5/1992 | Lang, Jr. | |
| 5,842,677 | A | | 12/1998 | Sweeney et al. | |
| 5,878,980 | A | * | 3/1999 | Cooley, Jr. | 244/172 |
| 5,961,078 | A | | 10/1999 | Edberg et al. | |
| 5,971,375 | A | * | 10/1999 | Simonian et al. | 267/136 |
| 6,012,680 | A | | 1/2000 | Edberg et al. | |

\* cited by examiner

*Primary Examiner*—Jack Lavinder
(74) *Attorney, Agent, or Firm*—Alston & Bird LLP

(57) ABSTRACT

A vibration isolator is provided that includes a plurality of elastomeric members. The vibration isolator also includes first and second supports. The first and second supports cooperate with the plurality of elastomeric members to isolate and damp vibration between the first and second supports. The first support defines a first raised portion. The second support is spaced from the first support and defines a second raised portion facing the first support. The first and second raised portions are structured to cooperate so as to define a recess therebetween adapted to at least partially receive at least one elastomeric member. The vibration isolator also includes at least one fastener that is structured to mount the at least one elastomeric member between the first and second supports such that the elastomeric member(s) isolates and damps vibration transmitted between the first and second supports.

19 Claims, 9 Drawing Sheets

ELASTOMERIC SUSPENSION AND MOUNTING SYSTEM

FIELD OF THE INVENTION

The present invention relates to vibration in mechanical systems and, more particularly, relates to an apparatus and associated method for mounting a payload to a vehicle and attenuating vibration therebetween.

BACKGROUND OF THE INVENTION

Satellites, spacecraft and other payloads are typically launched into orbit using a launch vehicle, such as a rocket. Most payloads are attached to the launch vehicle only at the base of the payload such that the payload is cantilevered to the vehicle. During launch, and while the payload is being transported to its proper orbit and velocity, the payload is subjected to a severe vibration and acoustic environment that creates dynamic loads or vibroacoustic loads (referred to herein as "vibration") that are transmitted to the payload from the launch vehicle. The vibration can be the result of environmental effects such as wind gusts, as well as events such as liftoff, motor ignitions and shutdowns, fuel depletion and jettisons of fairings, hatches, and booster stages. The vibration can have large amplitudes over a wide frequency range that can damage a payload or lead to on-orbit malfunctions or reduced operating lifetime. Due to the cost associated with the manufacture and launching of most payloads, vibration is considered to be an important factor in the structural design of both payloads and launch vehicles.

Most payloads are mounted on a rigid, inflexible payload support, which transmits all of the vibration directly to the payload. Conventional approaches to improving launch survival of payloads have typically involved stiffening the structural components of the payload, as opposed to providing a means of reducing the loads. However, structural stiffening requires a complete redesign and analysis, as well as the use of exotic and/or expensive materials and can necessitate an undesirable increase in the overall weight of the payload. In addition, the stiffened structural components still must undergo extensive and expensive testing to ensure that the payload will have a reasonable probability of launch survival.

Other approaches to improve launch survival have involved the use of flexible materials to isolate and reduce the transmission of vibration between the vehicle and payload. However, such approaches typically rely on friction to support shear loads, which can negatively affect the flexibility and integrity of the flexible materials.

Thus, there remains a need to replace the conventional design approach of structural stiffening with a vibration isolator that can securely attach a payload to a vehicle while at the same time effectively attenuate the transmission of vibration from the vehicle to the payload. The vibration isolator should be capable of supporting the payload under normal operating conditions, which include positive and negative acceleration in all three axes, attenuating vibration in six axes without relying on friction to support shear loads. The isolator should be capable of energy dissipation using damping or another process. In addition, the isolator must be such that it can be manufactured and assembled with a minimum number of parts to reduce the overall cost of manufacture, reduce assembly time, and minimize weight.

SUMMARY OF THE INVENTION

The present invention provides a vibration isolator that can securely attach a payload to a vehicle or a base, as well as effectively isolate the payload from vibration about six axes. Instead of the conventional stiff payload support, the present invention allows relative motion between the support and payload by placing a compliant material in the load path. The vibration isolator includes at least one elastomeric member, which can be formed of silicone, natural and synthetic rubber, or any other elastomer having a relatively high density, modulus of resilience, modulus of elasticity, and material damping. The vibration isolator also includes a first support and a second support spaced from the first support. The first and second supports cooperate with the plurality of elastomeric members to attenuate vibration between the supports.

In one embodiment, at least one, and preferably both of the first and second supports have a circular configuration. The first and second supports can be formed of metallic or composite materials, including, aluminum, AA 2000 series aluminum alloys, AA 6000 series aluminum alloys, AA 7000 series aluminum alloys, titanium, steel, carbon fiber composites, fiberglass fiber composites, or aramid fiber composites. In another embodiment, at least one of the first and second supports is formed of two interlocking members. The vibration isolator also includes at least one fastener that is structured to mount the elastomeric member(s) between the first and second supports such that the elastomeric member(s) allow relative motion and isolate vibration transmitted between the supports. In one embodiment, the stiffness of the vibration isolator is substantially proportional to the bulk modulus of elasticity of the elastomeric member(s).

In one embodiment, at least one elastomeric member is secured between the first and second supports. The securing step can comprise inserting at least one fastener through the first and second supports and the elastomeric member(s) positioned therebetween. The elastomeric member(s) allow relative displacement to thereby damp vibration between the first and second supports. The stiffness of the elastomeric member(s), and thus the entire isolation system, is substantially proportional to the bulk modulus of elasticity of the elastomeric member(s). The modular nature of the elastomeric members allows them to be changed individually or in groups in order to "tune" the stiffness and damping properties of the invention depending on the mass of the payload and the desired isolation and damping characteristics.

The first support of the vibration isolator preferably defines a first raised portion and the second support preferably defines a second raised portion. The first and second raised portions are structured to cooperate so as to define a recess therebetween adapted to at least partially receive the elastomeric member(s). In one embodiment, the first support defines a plurality of first raised portions and the second support defines a plurality of second raised portions, each of the first raised portions uniquely corresponding to one of the second raised portions. In another embodiment, the second raised portion of the second support comprises a pair of flanges and a web portion extending therebetween and the first raised portion of the first support comprises a second web portion and a flange. According to this embodiment, the second web portion of the first raised portion extends at least partially between the pair of flanges of the second raised portion and the flange of the first raised portion extends from the second web portion toward the web portion of the second raised portion. In yet another embodiment, the first support of the vibration isolator defines a first raised portion having a generally T-shaped configuration and the second support defines a second raised portion having a generally C-shaped configuration.

In still another embodiment, the present invention provides a mounting system including a payload and a base for supporting the payload. The mounting system includes a vibration isolator, as set forth above, for isolating and damping vibration between the base and the payload. In one embodiment, the first support is attached to the payload and the second support is attached to the base. In another embodiment, the first support is attached to the base and the second support is attached to the payload.

The present invention also provides a method of energy dissipation, which is provided by the elastomeric member(s) positioned between the first and second supports. Relative motion between the first and second supports strains the elastomeric member(s) which internally dissipate energy through self-heating. Any such heating is conducted away from the elastomeric member(s) by heat conduction to the first and second supports.

In another embodiment, the method includes providing a first support defining a first raised portion having a generally T-shaped configuration. In one embodiment the first support is attached to a payload. A second support is provided defining a second raised portion having a generally C-shaped configuration. In one embodiment, the second support is attached to a vehicle or a base. At least one elastomeric member is positioned at least partially between the first and second supports. In one embodiment, the at least one elastomeric member is secured between the first and second supports. The securing step can comprise inserting at least one fastener through the first and second supports and the at least one elastomeric member positioned therebetween. The at least one elastomeric member allows relative motion to thereby isolate and to also damp vibration between the first and second supports.

The present invention positions one or more compliant, elastomeric members between the first support and the second support. The compliant elastomeric member(s) provide isolation and damping properties. However, in cases where loads or accelerations result in a stretching axial load occurring at one or more of the elastomeric members, the fastener securing the elastomer between the supports is placed in tension. For this situation, elastomeric washers are placed between the head of the fastener and the first and second supports to ensure that the reactions are passed through the elastomeric member or members.

Accordingly, there has been provided a vibration isolator that can securely attach a payload to a vehicle while at the same time effectively isolate and damp the transmission of vibration between the base and the payload. The vibration isolator of the present invention is capable of damping the transmission of vibration about all axes. In addition, the isolator is such that it can be manufactured and assembled with a minimum number of parts to reduce the overall weight of the isolator so that the isolator can be easily assembled and disassembled. If desired, the support next to the payload can be incorporated into the payload structure, and the support next to the base can be incorporated into the base structure, for the purposes of reducing weight and height. It is also apparent that the invention can equally be used to support a vibrating payload on a fixed base structure, an application suited for mounting unbalanced or vibratory machinery or other items onto a fixed base without transmitting the vibrations to that base structure.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
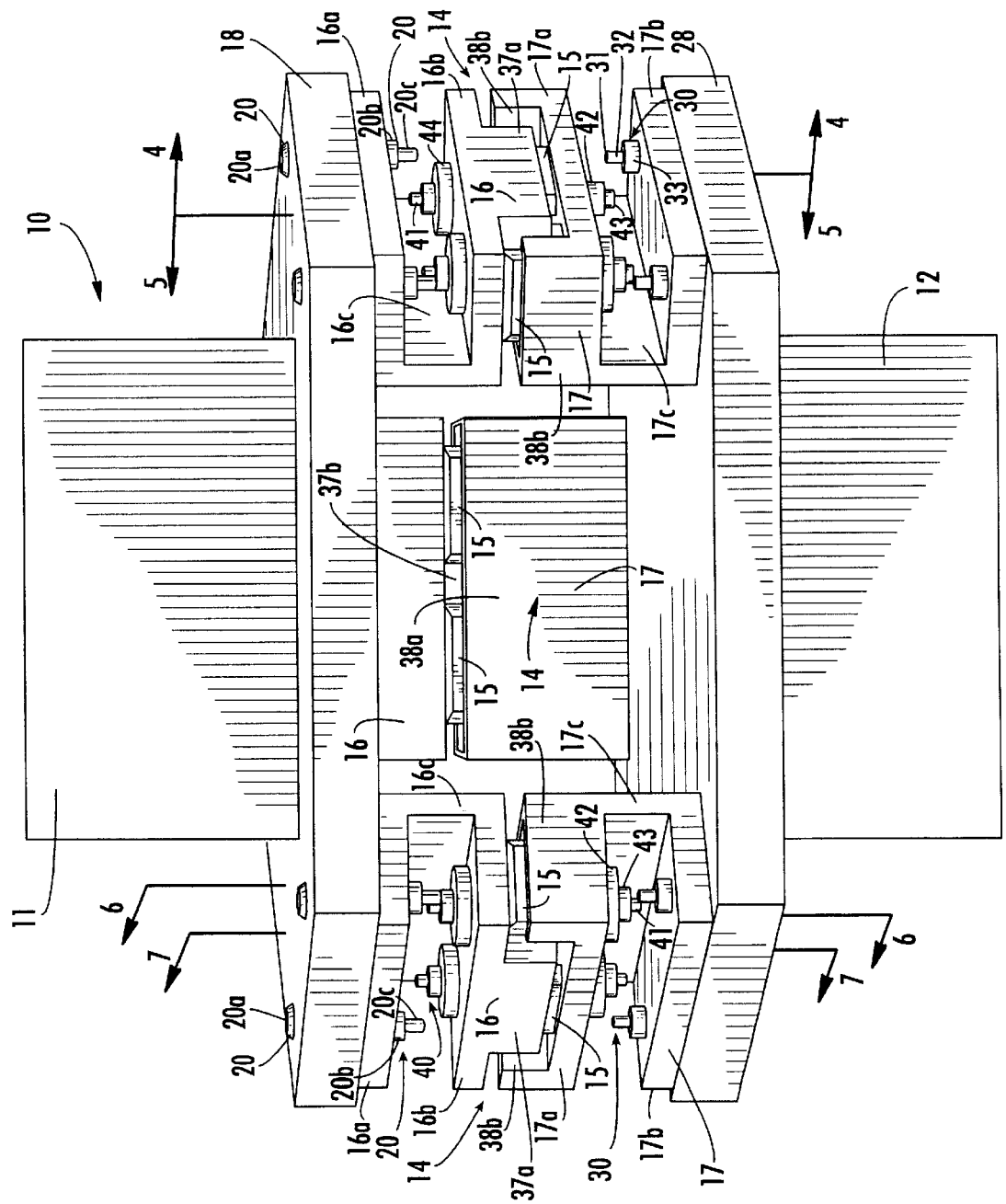
FIG. 1 is a perspective view illustrating an mounting system having a base, a payload and a vibration isolator, according to one embodiment of the present invention.

Referring to FIG. 1, there is illustrated a terrestrial and extraterrestrial mounting system 10, according to one embodiment of the present invention. The mounting system 10 includes a payload 11 and a base 12 for supporting the payload. The mounting system 10 also includes a vibration isolator 14 for securing the payload 11 to the base 12 and isolating and damping vibration between the base and the payload. For extraterrestrial transport, the base 12 can include, for purposes of example and not limitation, a vehicle such as a rocket, a space shuttle, or any other vehicle for transporting a payload 11 into orbit. The payload 11 can include a satellite, a telescope, a space station or component thereof, as well as equipment and/or supplies. For terrestrial transport, the base 12 can include, for purposes of example and not limitation, a vehicle such as a car, truck, trailer, airplane, boat or other motorized vehicle and the payload 11 will comprise the goods or products being transported. For terrestrial isolation, the base 12 can be fixed to the ground or another structure, and the payload 11 can be any machinery whose vibrations are not desired at the ground or support level.

Figure 2:
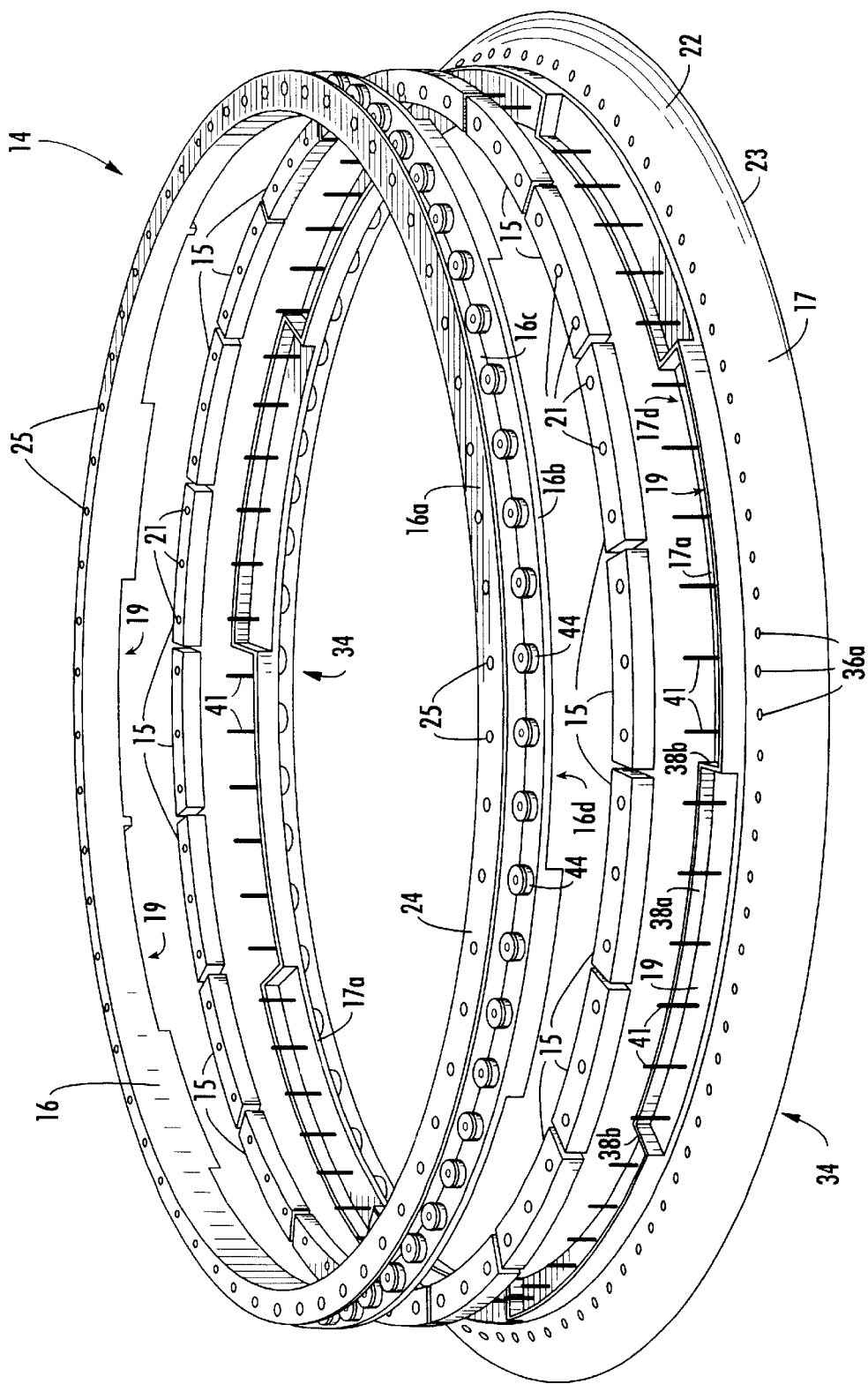
FIG. 2 is an exploded perspective view illustrating a vibration isolator, according to another embodiment of the present invention.
Figure 3:
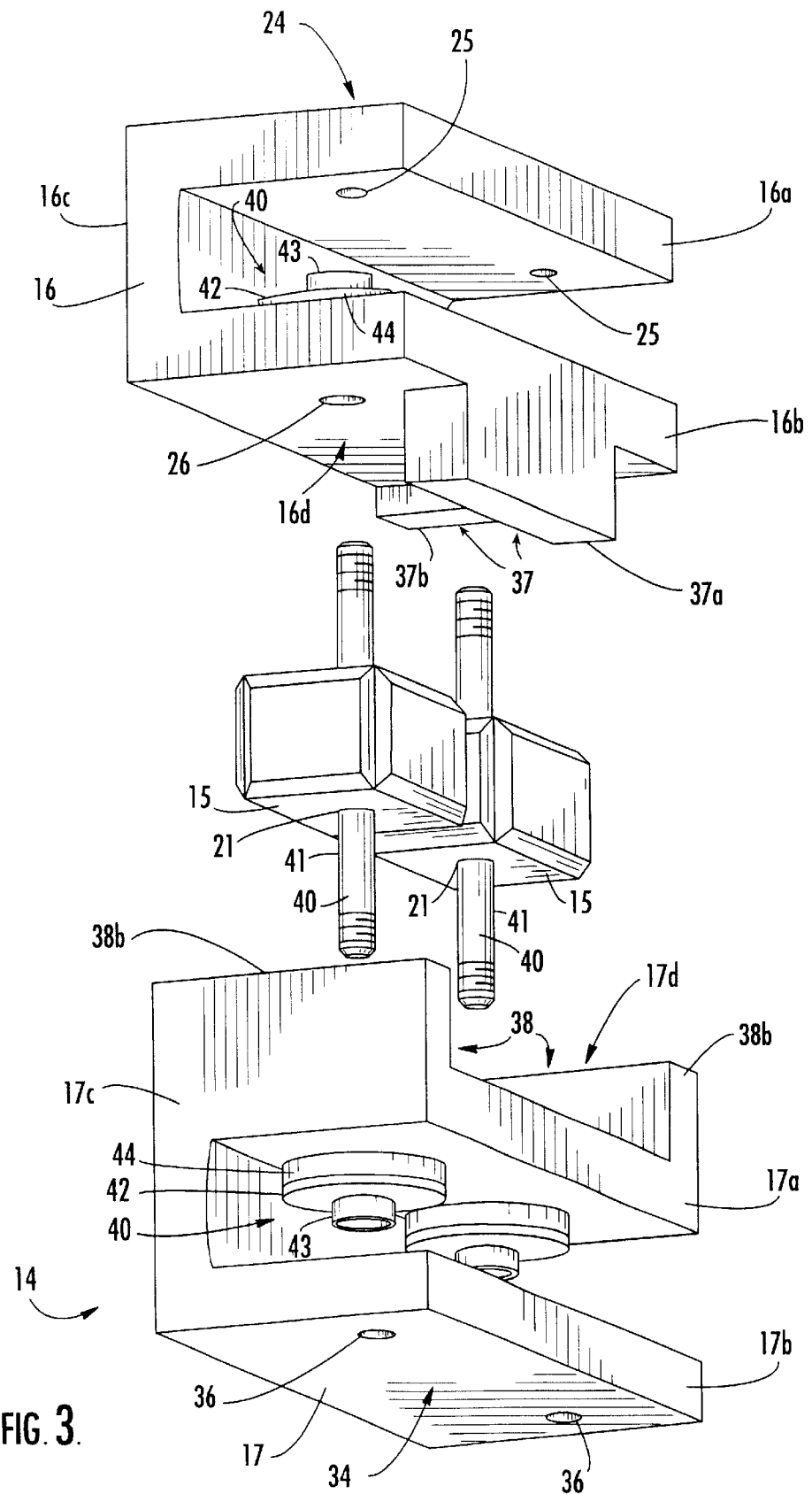
FIG. 3 is an exploded perspective view illustrating a vibration isolator, according to still another embodiment of the present invention.
Figure 6:
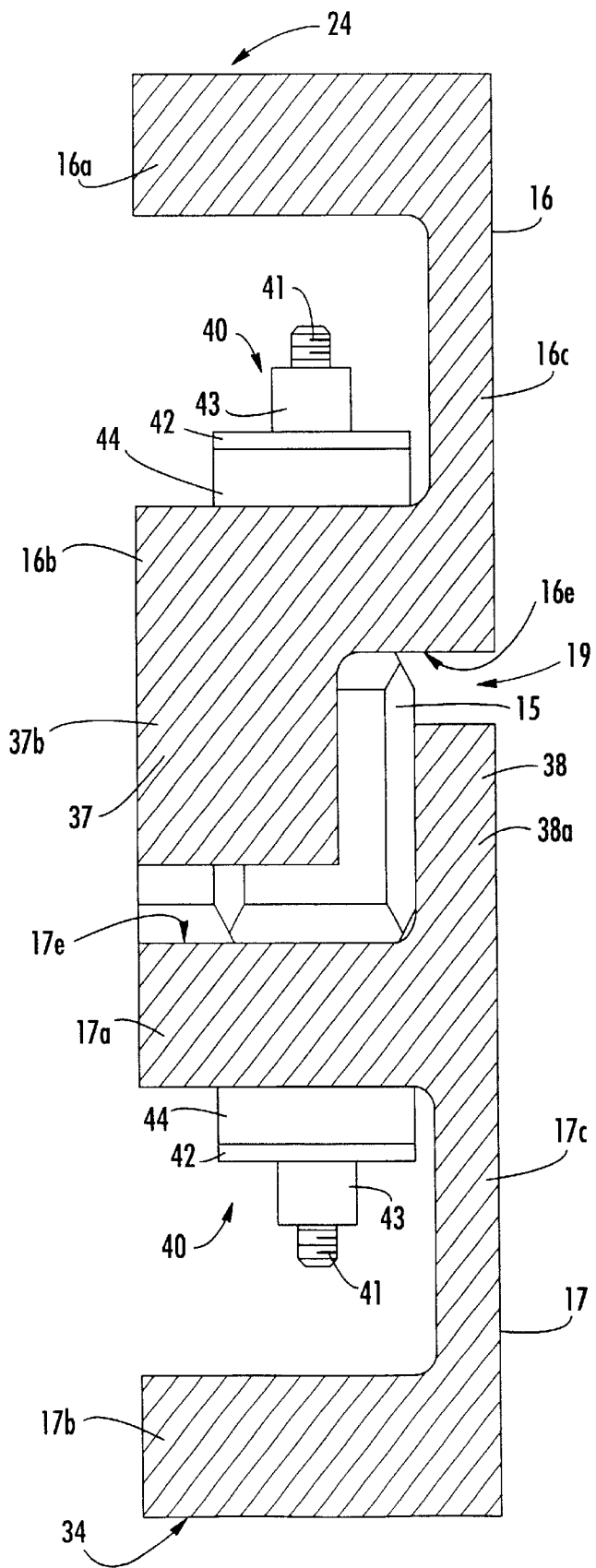
FIG. 6 is a cross-sectional view illustrating a vibration isolator of FIG. 1 along lines 6—6.
Figure 7:
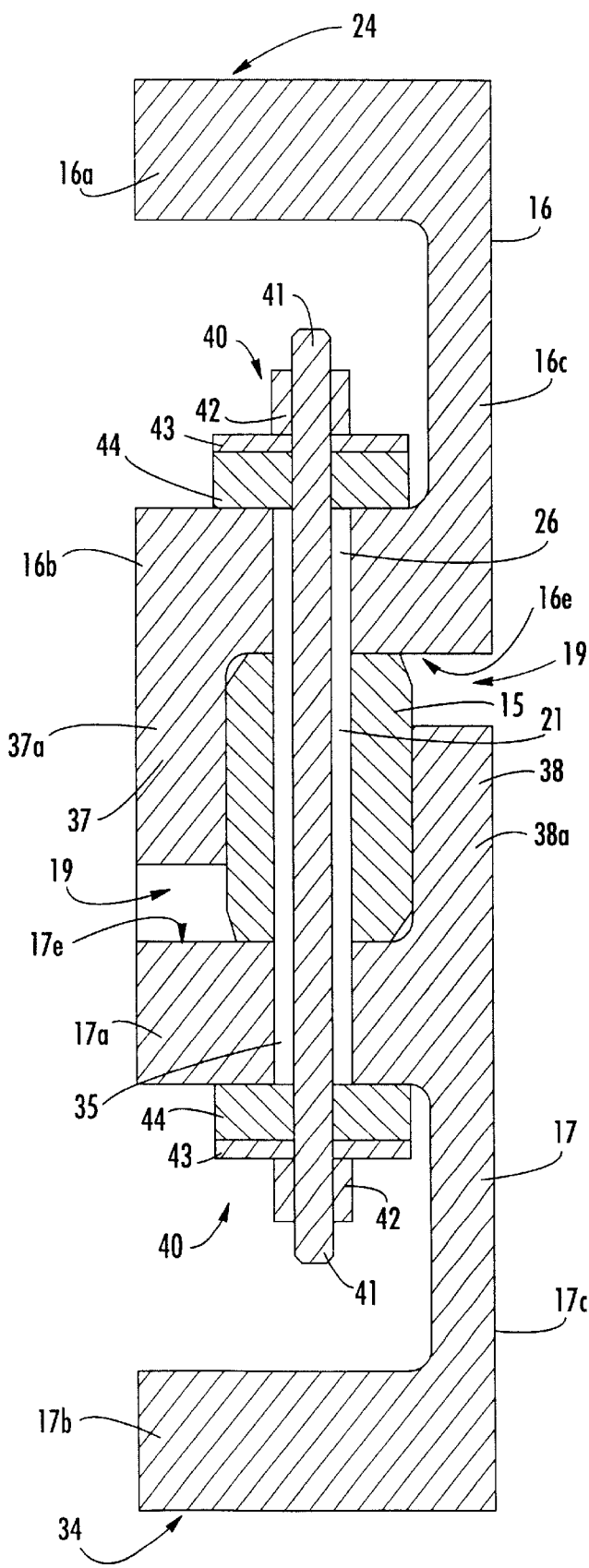
FIG. 7 is a cross-sectional view illustrating a vibration isolator of FIG. 1 along lines 7—7.

Referring to FIGS. 2 and 3, each vibration isolator 14 includes at least one and, preferably, a plurality of elastomeric members 15 for damping vibration, a first support 16, and a second support 17. The configuration and dimensions of the elastomeric members 15, the first support 16, and the second support 17, can vary depending on the application and, more particularly, on the weight and dimensions of the payload 11 and the amplitude and frequency of vibration anticipated during transport. As illustrated in FIG. 2, the first support 16 can have a circular or elliptical configuration such that the first support forms a ring. In other embodiments, as illustrated in FIG. 3, the first support 16 can have a square or rectangular configuration. Referring to FIGS. 6 and 7, the first support 16 preferably has a generally U-shaped cross-section defined by first and second flanges 16a, b and a web portion 16c extending therebetween. The first flange 16a of the first support 16 defines a relatively flat outer surface 24 that can be secured to a fairing, mount or other structure 18 on the payload 11 using suitable fasteners 20, as is known in the art. For example, as illustrated by a comparison of FIGS. 1 and 3, the outer surface 24 of the first flange 16a of the first support 16 can include a plurality of apertures 25 adapted to receive fasteners 20 such as bolts 20a that can be secured with washers 20b and lock nuts 20c. In other embodiments, the first flange 16a of the first support 16 can be secured permanently to the payload 11 by welding or can even be formed integrally with the frame of the payload. The first support 16 can be cast, forged, machined or molded from stock material and, preferably, is formed of material having a high strength to weight ratio, such as aluminum, AA 2000 series aluminum alloys, AA 6000 series aluminum alloys, AA 7000 series aluminum alloys, titanium, carbon fiber composites, fiberglass fiber composites, and aramid fiber composites. For terrestrial applications, the first support 16 can be formed of steel.

As illustrated in FIG. 2, the second support 17 can also have a circular or elliptical configuration such that the second support forms a ring. In other embodiments, as illustrated in FIG. 3, the second support 17 can have a square or rectangular configuration. Referring to FIGS. 6 and 7, the second support 17 preferably has a generally U-shaped cross-section defined by first and second flanges 17a, b and a web portion 17c extending therebetween. In an alternate embodiment, as illustrated in FIG. 2, the second support 17 includes a skirt 22 that flares outwardly from the first flange 17a of the second support to define a base portion 23. As illustrated in FIG. 3, the second flange 17b of the second support 17 or the base portion 23 of the skirt 22 preferably defines a relatively flat outer surface 34 that can be secured to a fairing, mount or other structure 28 defined by the base or vehicle 12 using suitable fasteners 30, as is known in the art. For example, in one embodiment, as illustrated in FIGS. 1 and 3, the outer surface 34 of the second flange 17b of the second support 17 includes a plurality of apertures 36 adapted to receive fasteners 30 such as bolts 31 that can be secured with washers 32 and lock nuts 33. The skirt illustrated in FIG. 2 can also include apertures 36a adapted to receive suitable fasteners. In other embodiments, the second flange 17b or skirt 22 of the second support 17 can be secured permanently to the vehicle 12 by welding or can even be formed integrally with the frame of the vehicle. The second support 17 can be cast, forged or machined from stock material and, preferably, is formed of material having a high strength to weight ratio, such as aluminum, AA 2000 series aluminum alloys, AA 6000 series aluminum alloys, AA 7000 series aluminum alloys, titanium, carbon fiber composites, fiberglass fiber composites, and aramid fiber composites. For terrestrial applications, the second support 17 can be formed of steel. Although the above discussion describes the first support 16 as corresponding to the payload 11 and the second support 17 as corresponding to the base 12, the first and second supports are interchangeable and each may be secured to either the payload or the base.

The mounting system preferably includes a vibration isolator 14 with first and second supports 16, 17 having a circular or elliptical configuration so that vibration is damped around the entire perimeter of the mountings 18, 28 of the payload 11 and base 12. For embodiments of the vibration isolator 14 wherein the first and second supports 16, 17 having a square or rectangular configuration, as illustrated in FIGS. 1 and 3, one or more isolators may be used to damp the transmission of vibration between the supports and, thus, the payload 11 and base 12. For example, in the embodiment illustrated in FIG. 1, three vibration isolators 14 are spaced equidistantly about the perimeter of the mounts 18, 28 of the payload 11 and vehicle 12, respectively. The isolators 14 may be configured in any quantity, and arranged in any pattern, regular or non-regular, on the base necessary to support any shape and mass of payload.

As illustrated in FIGS. 4–7, the first flange 17a of the second support 17 is spaced from the second flange 16b of the first support 16 so as to define at least one recess or gap 19 therebetween that is structured to at least partially receive at least one of the elastomeric members 15. Preferably, the recesses 19 are spaced evenly along the length of the first and second supports 16, 17. For example, in the embodiment illustrated in FIG. 2, the first and second supports 16, 17 each comprise a ring such that the first flange 17a of the second support 17 and the second flange 16b of the first support 16 define a plurality of recesses 19 along the length of each support, each recess 19 extending between the inside and outside circumference of the rings.

As illustrated in FIGS. 3–7, the second flange 16b of the first support 16 and the first flange 17a of the second support 17 each has a facing outer surface 16d, 17d defining a first raised portion 37 and a second raised portion 38, respectively. The first and second raised portions 37, 38 are structured to cooperate so as to define a corresponding recess therebetween 19. In one embodiment, as illustrated in FIG. 2, the first support 16 defines a plurality of first raised portions 37 and the second support 17 defines a plurality of second raised portions 38, each of the first raised portions corresponding to one of the second raised portions. As illustrated in FIGS. 3–7, the first raised portion 37 of the first support 16 preferably has a generally T-shaped configuration defined by a web portion 37a and a flange 37b. The second raised portion 38 of the second support 17 has a generally C-shaped configuration defined by a pair of flanges 38b and a web portion 38a extending therebetween.

Figure 4:
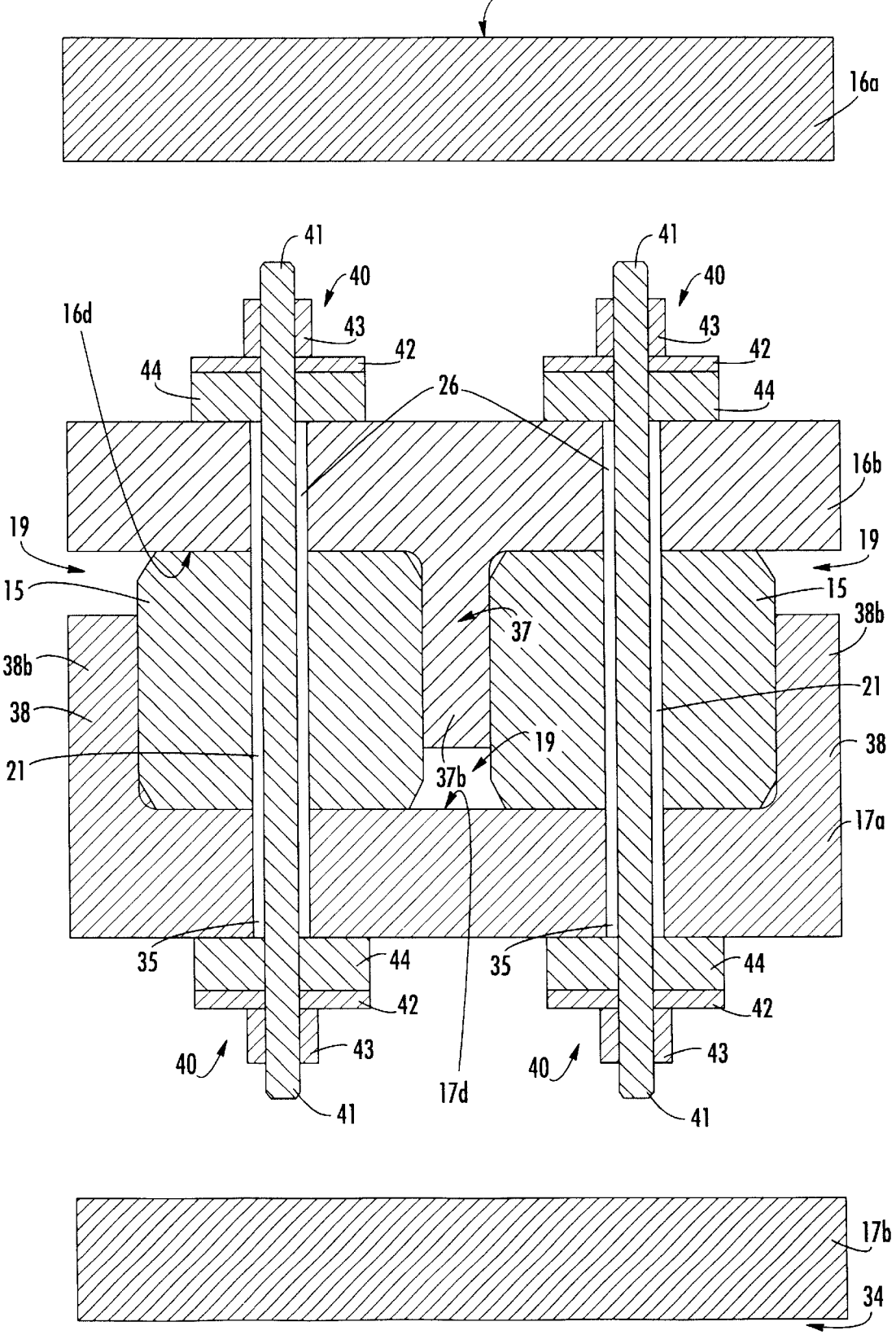
FIG. 4 is a cross-sectional view illustrating a vibration isolator of FIG. 1 along lines 4—4.
Figure 5:
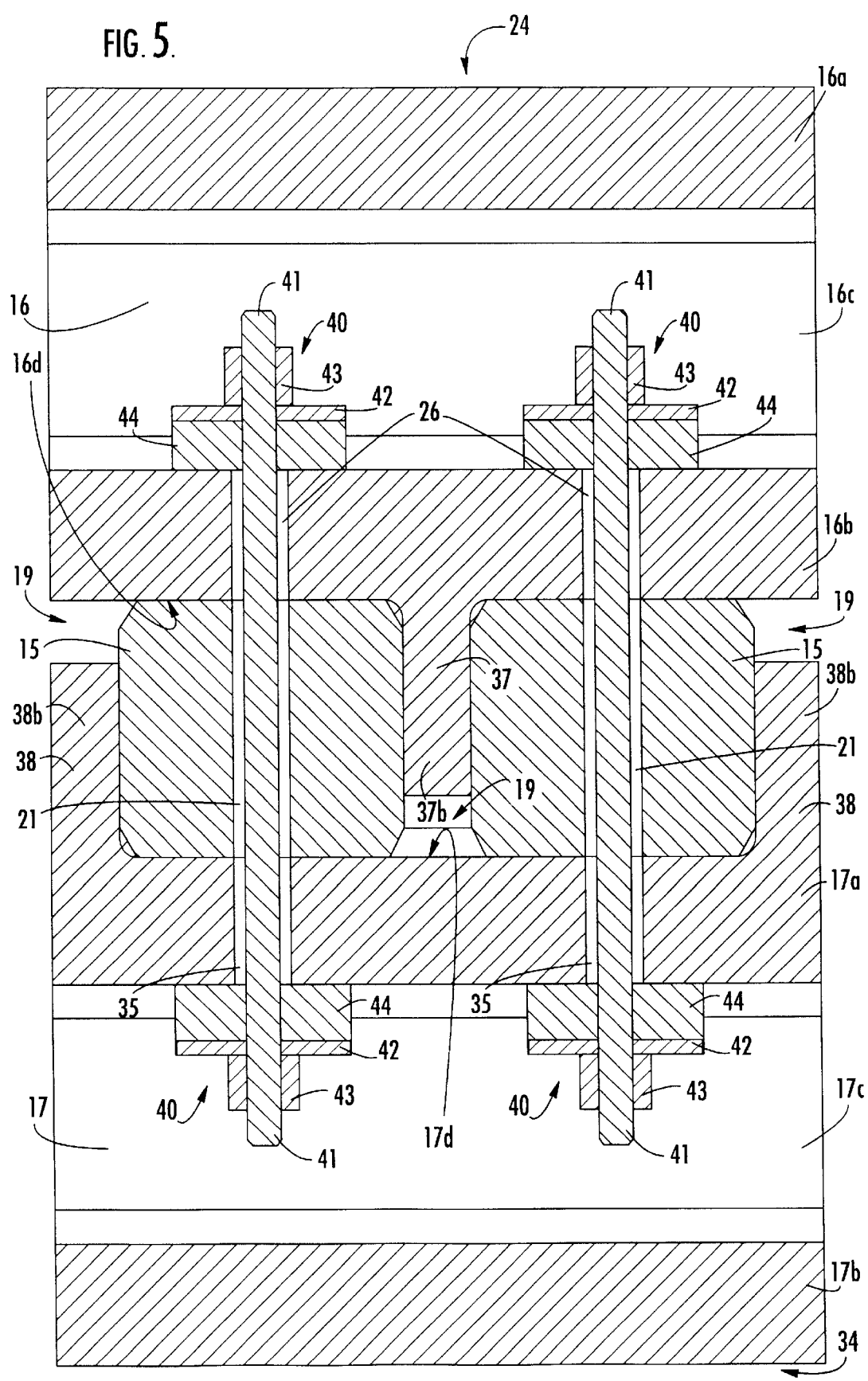
FIG. 5 is a cross-sectional view illustrating a vibration isolator of FIG. 1 along lines 5—5.

According to one embodiment, the web portion 37a of the first raised portion 37 extends at least partially between the pair of flanges 38b of the second raised portion 38 so as to define a raised border at least partially about the perimeter of the facing surfaces 16e, 17e of the first and second supports 16, 17. The flange 37b of the first raised portion 37 extends from the web portion 37a of the first raised portion toward the web portion 38a of the second raised portion 38. The flange 37b of the first raised portion 37 is adapted to retain one or more corresponding elastomeric members 15 (in cooperation with the fasteners 40), while allowing the elastomeric member or members to bulge against and between the first and second raised portions 37, 38 in response to vibration, tension, compression and shear loads. As illustrated in FIGS. 4–6, the flange 37b of the first raised portion 37 is positioned between two elastomeric members 15. In another embodiment (not shown), the flange 37b of the first raised portion 37 extends laterally across one or more elastomeric members. Advantageously, the vibratory displacing or bulging of the elastomeric members 15 dissipates a fraction of the energy transmitted along the load paths through vibration, tension, compression and shear loads with minimal friction between the elastomeric members and the supports 16, 17.

Since the first and second raised portions 37, 38 do not restrain the bulging motion of the elastomeric members 15, the stiffness of the system is dominated by the elastomeric member's bulk modulus of elasticity. The bulk modulus of elasticity K is defined for an isotropic material as the ratio of normal stress, applied to all six faces of a cube, to a change of volume, and can be represented as follows:

$$K=E/[3(1-2\mu)],$$

where E is Young's modulus and $\mu$ is Poisson's ratio. Young's modulus E is defined as the ratio of a unit of stress per unit of deformation. Poisson's ratio $\mu$ is the negative of the ratio of lateral strain to axial strain caused by uniaxial displacement. Because of the dominance of the bulk modulus of elasticity K, the vibration isolators 14 of the present invention advantageously allow larger displacements and damping yet provide a high stiffness value.

As illustrated in FIGS. 3, 4, 5 and 7, the vibration isolator 14 includes at least one and, preferably, a plurality of fasteners 40 that are each structured to mount a corresponding elastomeric member 15 between the second flange 16b of the first support 16 and the first flange 17a of the second support 17 such that the elastomeric members isolate and damp vibration transmitted between the first support and the second support. Each fastener 40 can include a bolt 41, a pair of washers 42, a pair of elastomeric bushings 44, and a pair of lock nuts 43. The bolt 41 of each fastener 40 preferably extends through an aperture 26 defined by the second flange 16b of the first support 16, through an aperture 21 defined by the elastomeric member 15 positioned between the first and second supports 16, 17, and, lastly, through an aperture 35 defined by the first flange 17a of the second support 17. Elastomeric bushings 44 are positioned over each end of the bolt 41 and moved adjacent the corresponding second flange 16b of the first support 16 or the first flange 17a of the second support 17 to provide an elastomeric load path between the washers 42 and the first and second supports. Washers 42 can be positioned over each end of the bolt 41 and moved adjacent the corresponding rubber bushing 44. Lock nuts 43 can then be threaded onto each end of the bolt 41 to secure the bolt in position and thereby mount the plurality of elastomeric members 15 between the corresponding supports.

The tightness of the nuts 43 on the bolts 41 determines the amount of preload applied to the elastomeric members 15. The preload applied by the fastener 40 will depend on a variety of factors, including the weight and dimensions of the payload 11, the number of elastomeric members 15 being used, the amplitude and frequency of vibration anticipated, the elastic modulus of the elastomeric member, the compression set limit of the elastomeric members, and inertial load factors (i.e., the static portion of the accelerations, which is additive to the amplitude of the vibration). The higher the preload the stiffer the vibration isolator 14 and, conversely, the lower the preload the softer the vibration isolator. The number of fasteners 40 can vary depending on the application and, more particularly, on the length of the first and second supports, the number and modulus of elastomeric members 15, the weight and dimensions of the payload 11, and the amplitude and frequency of vibration anticipated during transport or operation.

The elastomeric members 15 can be formed of silicone, natural and synthetic rubber, or any other elastomer having a relatively high density, modulus of resilience, modulus of elasticity, and the desired damping characteristics. In one embodiment, the elastomeric members 15 are formed of a silicone rubber made by Kirkhill Rubber Company as product no. 980L5663. In another embodiment, the elastomeric members 15 are formed of VITON® elastomer, which is a synthetic rubber made by DuPont Dow Elastomers, L.L.C, or HI-DAMP® elastomer, which is a synthetic rubber made by Barry Wright Corporation, provided that the isolator 14 is placed in an insulated area of the vehicle 12 so that the ambient temperature does not become so low that the elastomeric members become brittle (this is primarily an issue in extraterrestrial transports). As illustrated in FIGS. 3 and 5, the elastomeric members 15 can be configured in the shape of blocks. The width, height, and length of each elastomeric member 15 can vary depending on the application and, more particularly, on the weight and dimensions of the payload 11, the number of elastomeric members being used, the amplitude and frequency of vibration anticipated, the elastic modulus of the elastomeric member, the compression set limits of the elastomeric member, and inertial load factors (i.e., the static portion of the accelerations, which is additive to the amplitude of the vibration). In one embodiment, the elastomeric members 15 have a width W of approximately 2 inches, a length L of approximately 1.25 inches, and a height H of approximately 1.0 inches. As discussed above, each elastomeric member 15 preferably defines at least one aperture 21 therethrough that is adapted to receive a fastener 40. While the diameter of each aperture 21 may vary, according to one embodiment, each elastomeric member 15 defines two apertures 21 each having a diameter of approximately 0.4 inches. As discussed above, the first support 16 and the second support 17 may have circular configurations in which case the sides of the elastomeric members 15 are preferably radiused.

Figure 8:
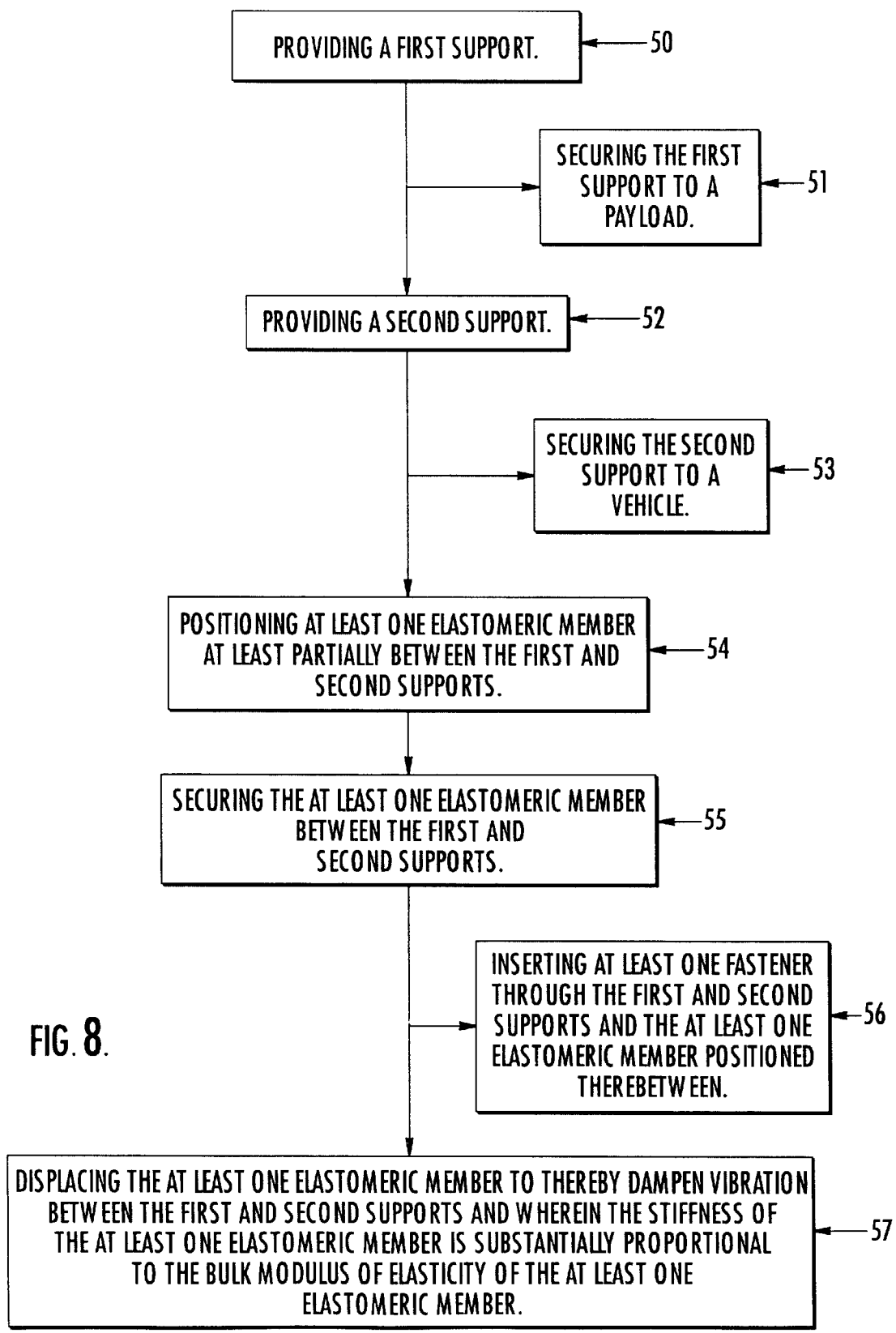
FIG. 8 is a flow chart illustrating a method of damping vibration, according to one embodiment of the present invention.

The present invention also provides a method of damping vibration. As illustrated in FIG. 8, the method includes providing a first support. See block 50. In one embodiment the first support is attached to a payload. See block 51. A second support is provided. See block 52. In one embodiment, the second support is attached to a vehicle. See block 53. At least one elastomeric member is positioned at least partially between the first and second supports. See block 54. In one embodiment, the at least one elastomeric member is secured between the first and second supports. See block 55. The securing step can comprise inserting at least one fastener through the first and second supports and the at least one elastomeric member positioned therebetween. See block 56. The at least one elastomeric member is then displaced to thereby damp vibration between the first and second supports and wherein the stiffness of the at least one elastomeric member is substantially proportional to the bulk modulus of elasticity of the at least one elastomeric member. See block 57.

Figure 9:
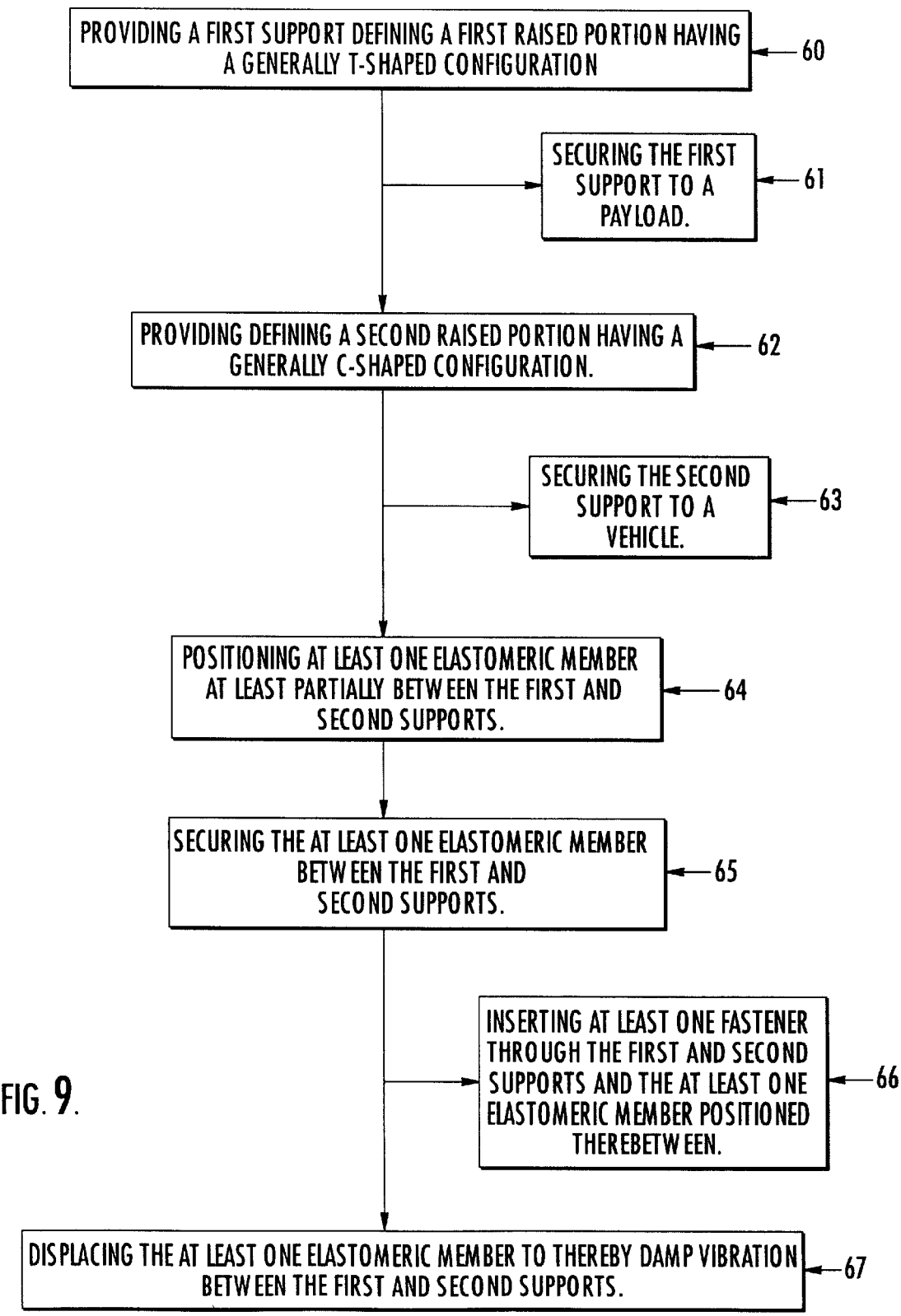
FIG. 9 is a flow chart illustrating a method of damping vibration, according to another embodiment of the present invention.

In another embodiment, as illustrated in FIG. 9, the method includes providing a first support defining a first raised portion having a generally T-shaped configuration. See block 60. In one embodiment the first support is attached to a payload. See block 61. A second support is provided defining a second raised portion having a generally C-shaped configuration. See block 62. In one embodiment, the second support is attached to a vehicle. See block 63. At least one elastomeric member is positioned at least partially between the first and second supports. See block 64. In one embodiment, the at least one elastomeric member is secured between the first and second supports. See block 65. The securing step can comprise inserting at least one fastener through the first and second supports and the at least one elastomeric member positioned therebetween. See block 66. The at least one elastomeric member is displaced to thereby damp vibration between the first and second supports. See block 67.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vibration isolator for damping vibration, comprising:
   at least one elastomeric member;
   a first support defining a first raised portion having a generally T-shaped configuration;
   a second support spaced from said first support and defining a second raised portion facing said first support, said second raised portion having a generally C-shaped configuration, said first and second raised portions being structured to cooperate so as to define a recess therebetween adapted to at least partially receive said at least one elastomeric member; and
   at least one elongate fastener being structured to mount said at least one elastomeric member between said first and second supports such that said at least one elastomeric member is displaceable within said recess to thereby isolate and damp vibration transmitted between said first and second supports and wherein the stiffness of the vibration isolator is substantially proportional to the bulk modulus of elasticity of said at least one elastomeric member and not the Young's modulus.

2. A vibration isolator according to claim 1 wherein said first support defines a plurality of first raised portions and said second support defines a plurality of second raised portions, each of said first raised portions corresponding to one of said second raised portions.

3. A vibration isolator according to claim 2 wherein each of said first and second supports has a circular configuration.

4. A vibration isolator according to claim 1 wherein said first and second supports are formed of materials selected from the group consisting of aluminum, AA 2000 series aluminum alloys, AA 6000 series aluminum alloys, AA 7000 series aluminum alloys, titanium, steel, carbon fiber composites, fiberglass fiber composites, and aramid fiber composites.

5. A vibration isolator according to claim 1 further comprising at least one elastomeric bushing positioned between at least one of said first and second supports and said at least one fastener.

6. A vibration isolator according to claim 1 wherein at least one of said first and second supports is formed of two interlocking members.

7. A vibration isolator according to claim 1 wherein said at least one elastomeric member is formed of materials selected from the group consisting of silicone, natural rubber, and synthetic rubber.

8. A mounting system, comprising:
   a payload;
   a vehicle for transporting said payload; and
   a vibration isolator for securing said payload to said vehicle and damping vibration between said vehicle and said payload, comprising:
      at least one elastomeric member;
      a first support defining a first raised portion having a generally T-shaped configuration, said first support being secured to said payload;
      a second support spaced from said first support and being secured to said vehicle, said second support defining a second raised portion facing said first support and having a generally C-shaped configuration, said first and second raised portions being structured to cooperate so as to define a recess therebetween adapted to at least partially receive said at least one elastomeric member; and
      at least one elongate fastener being structured to mount said at least one elastomeric member between said first and second raised portions such that said at least one elastomeric member is displaceable within said recess to thereby isolate and damp vibration transmitted between said first and second supports and wherein the stiffness of the vibration isolator is substantially proportional to the bulk modulus of elasticity of said at least one elastomeric member and not the Young's modulus.

9. A mounting system according to claim 8 wherein said first support defines a plurality of first raised portions and said second support defines a plurality of second raised portions, each of said first raised portions corresponding to one of said second raised portions.

10. A mounting system according to claim 9 wherein each of said first and second supports has a circular configuration.

11. A mounting system according to claim 8 wherein said first and second supports are formed of materials selected from the group consisting of aluminum, AA 2000 series aluminum alloys, AA 6000 series aluminum alloys, AA 7000 series aluminum alloys, titanium, steel, carbon fiber composites, fiberglass fiber composites, and aramid fiber composites.

12. A mounting system according to claim 8 wherein at least one of said first and second supports is formed of two interlocking members.

13. A mounting system according to claim 8 wherein said at least one elastomeric member is formed of materials selected from the group consisting of silicone, natural rubber, and synthetic rubber.

14. A method of isolating and damping vibration, comprising:
    providing a first support defining a first raised portion having a generally T-shaped configuration:
    providing a second support defining a second raised portion having a generally C-shaped configuration;
    positioning at least one elastomeric member at least partially within a recess defined by the first and second supports such that the at least one elastomeric member is displaceable within the recess; and
    displacing the at least one elastomeric member within the recess to thereby isolate and damp vibration between the first and second supports and wherein the at least one elastomeric member has a stiffness substantially proportional to the bulk modulus of elasticity of the at least one elastomeric member.

15. A method according to claim 14 further comprising attaching the first support to a payload.

16. A method according to claim 14 further comprising attaching the second support to a vehicle.

17. A method according to claim 14 further comprising securing the at least one elastomeric member between the first and second supports.

18. A method according to claim 14 further comprising dissipating vibratory energy as heat after said displacing step.

19. A method according to claim 17 wherein said securing step comprises inserting at least one fastener through the first and second supports and the at least one elastomeric member positioned therebetween.

* * * * *